Figure 1:
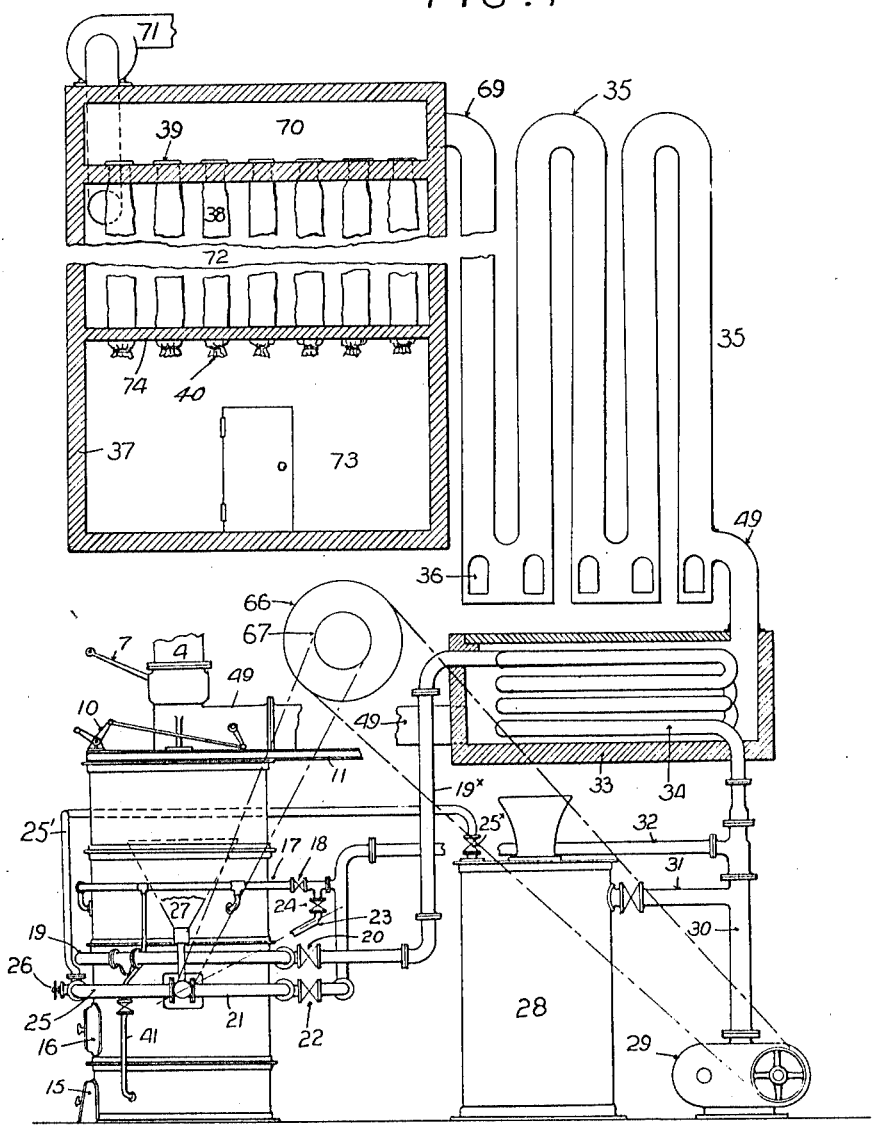

E. E. BANES.
PROCESS AND APPARATUS FOR TREATING SULFID ORES.
APPLICATION FILED JUNE 12, 1911.

1,073,462.

Patented Sept. 16, 1913.
3 SHEETS—SHEET 1.

E. E. BANES.
PROCESS AND APPARATUS FOR TREATING SULFID ORES.
APPLICATION FILED JUNE 12, 1911.

1,073,462.

Patented Sept. 16, 1913.
3 SHEETS—SHEET 3.

WITNESSES:

INVENTOR,
Ernest Edmund Banes
By Hull & Smith
ATTYS.

UNITED STATES PATENT OFFICE.

ERNEST EDMUND BANES, OF STRATHFIELD, NEAR SYDNEY, NEW SOUTH WALES, AUSTRALIA.

PROCESS AND APPARATUS FOR TREATING SULFID ORES.

1,073,462.  Specification of Letters Patent.  Patented Sept. 16, 1913.

Application filed June 12, 1911. Serial No. 632,705.

*To all whom it may concern:*

Be it known that I, ERNEST EDMUND BANES, a subject of the King of Great Britain and Ireland, residing at 5 The Avenue, Strathfield, near Sydney, in the State of New South Wales, Australia, have invented new and useful Improvements in Processes and Apparatus for Treating Sulfid Ores, of which the following is a specification.

In the processes heretofore proposed for the manufacture of "sublimed white lead" from ores and concentrates containing galena, it has been found impracticable to effect conversion of all the lead into a white pigment of uniform color and composition. It has been claimed in some cases that all or nearly all the lead is sublimed, but in those cases a portion only of the product is obtained as a commercial white pigment. No process is known by which substantially the whole of the lead can be certainly sublimed into a white pigment of uniform composition and satisfactory color. In certain of these known processes ore or concentrates containing galena is roasted in a furnace and oxidation of the gaseous furnace products is completed in a separate chamber in which in some cases heating gas is burned to maintain a high temperature; in other known processes oxidation of the galena is effected in the furnace. Various methods of roasting the ore or concentrate have been used. When the ore or concentrates are roasted on or intermixed in a bed of live fuel, air being introduced over said fuel either in a cool condition through apertures in the furnace walls, or in a heated condition through twyers, certain reactions occur which result in the introduction of discoloring matters into the fume, and that is so whether the roasting is conducted with the object of fuming the whole of the lead or of fuming only a portion of it. When, according to another method, the powdered ore or concentrates either alone or mixed with powdered fuel, are introduced into a furnace in a descending shower so that they shall fall on to a bed of glowing fuel, only a portion of the galena is sublimed satisfactorily and lead is found contained in a matte or mixed in a slag in the furnace, and it is not possible to maintain a working condition which will insure the continuous production of a white sublimate of uniform color and quality. Similar disadvantages are encountered when powdered ore or concentrates either alone or mixed with powdered fuel, are showered into a heated chamber, and acted upon while passing through said chamber by blasts of air and combustible gas which supply oxygen and maintain temperature.

Whenever particles of lead sulfid ore or concentrates are in contact with each other or with other substances at high temperatures, reactions of a complex character occur. Reduction of part of the lead to the metallic form occurs in consequence of the reactions of lead sulfid with lead oxid, and lead sulfid with lead sulfate. The reactions which occur in the case of individual particles are reversible and the direction in which they proceed depends upon the equilibrium existing as between the temperature and the composition and partial pressure of the gases in immediate contact with the respective particles. In the case of the roasting of a charge of galena sprinkled or heaped upon a fuel bed or intermixed therein, the partial pressures of the various furnace gases are different in different localities in the furnace, and the temperature is not uniform at all points therein. The fume produced will then contain or carry over with it some particles of sulfid which are completely sulfated, others sulfated on the surface over a sulfid core, and others sulfated on the surface over an oxid core. Again, where a particle has been subjected to excessive initial temperature, its surface may become sintered and a sulfid core retained upon which the furnace atmosphere does not react, and when that occurs unconverted sulfid will pass over with the fume.

In my process complete sublimation of the whole of the lead contained in the ore or concentrates is effected and a product is obtained of uniform white color and composition. The sublimate thus obtained is similar to "sublimed white lead" known in commerce; and is believed to be an amorphous basic lead sulfate or a product the formula of which may be expressed as $Pb_3S_2O_9$, consisting of amorphous lead sulfate and amorphous lead monoxid in a state of intimate association. When the ore or concentrates treated contains zinc, zinc oxid will be recovered from the fume as a sublimate mixed with the lead salt.

In carrying out my invention, finely powdered lead sulfid (or finely powdered ore or concentrates containing a high proportion of lead sulfid) is fed continuously into a furnace through a blow pipe flame, and is thereby dispersed and completely volatilized and projected in a volatilized condition into an enveloping oxidizing atmosphere the temperature of which is maintained at a point at which the required reactions occur. The particles are dispersed, and volatilization is completed within the blow pipe flame; matting and slagging are thus inhibited and the particles are each separately acted upon under identical conditions of reaction. Complete control of temperature and gaseous content of the furnace atmosphere and complete volatilization of the galena while suspended in a dispersed condition in the blowpipe flame are essential conditions called for to insure the complete conversion of all the lead to a sulfate sublimate. The fume from the furnace throat is passed through cooling and depositing chambers (in which gangue dust, iron oxid, and overcarried particles of unoxidizable matter are separated and retained) and through flues to a bag room where the pigment is separated therefrom and waste gases drawn off for other use or permitted to escape. For a furnace intended for the treatment of concentrates containing 3 cwt. of galena per hour the flues should have a length of several hundred feet and a cross section of at least one and a half square feet and the bag room should contain a bag surface of about 3000 square feet, but a substantial variation in these proportionate measurements is permissible. In the lower part of the furnace a bed of carbonaceous fuel is maintained in a burning condition by an air draft introduced through the closed ash pit; the quantity of air thus introduced is sufficient only to produce carbon monoxid—as in a gas producer—as a result of the partial combustion of the fuel, but as the upper surface of the fuel bed is in contact with an atmosphere rich in oxygen, the carbon monoxid burns at once to carbon dioxid and an incandescent condition is thus maintained at the surface of the fuel.

The ore or concentrates are finely powdered to any gage not coarser than, say, 40 mesh wire screen, but preferably much finer, and introduced into the furnace within a blast of air and combustible gas through two or more opposed blow pipes which are directed toward a point a few inches above the level of the fuel bed. Hot air is blown through twyers toward the same point or a little above it, and supplementary cold air twyers are fitted above the hot air twyers, these latter preferably entering the furnace tangentially in order that the energy of the incoming blast of air will be made use of for the purpose of rotating or swirling the atmosphere in the upper part of the furnace and thus maintaining its composition uniform and reducing its temperature if it be found excessive. When the ore or concentrates are so deficient in sulfur that a sufficiently high reaction temperature is not maintained by the oxidation thereof and by the combustion of the gas and fuel, carbonaceous fuel preferably in the form of finely powdered coal or coke or charcoal, in quantity sufficient to supply the heat deficiency, is mixed with the feed. The blow pipes through which the feed is introduced are water jacketed to keep their temperature below the fusing point of galena, and the construction of said blow pipes is such as to impart a whirling motion to the air, gas, and solid matters delivered by them into the furnace. The furnace is lined with refractory material and is fitted with a close fitting firing door and a close fitting ashpit door, and is provided with poke holes and sight holes, and also with a throat by-pass at the head to allow exit of gases and smoke in lighting up or in case of flue accident, and control valves or gates are provided for gas, hot air, cold air, and mineral and fuel feeds. The volume of the furnace should be substantial in relation to the quality of galena to be treated therein, as it is necessary in order to insure perfect whiteness of the sublimed product to fully expose the volatilized galena to oxidizing conditions in the upper part of the furnace before it passes into the flues. While any particular dimensions are not essential it is desirable that the cubic content of a furnace for the treatment of ore or concentrates containing 3 cwt. of galena per hour should be about 240 cubic feet and that the air supplies shall be sufficient to introduce a surplusage of air in addition to the volume required chemically for the combustion of the fuel and for the reactions in which the fume is produced.

Figure 2:
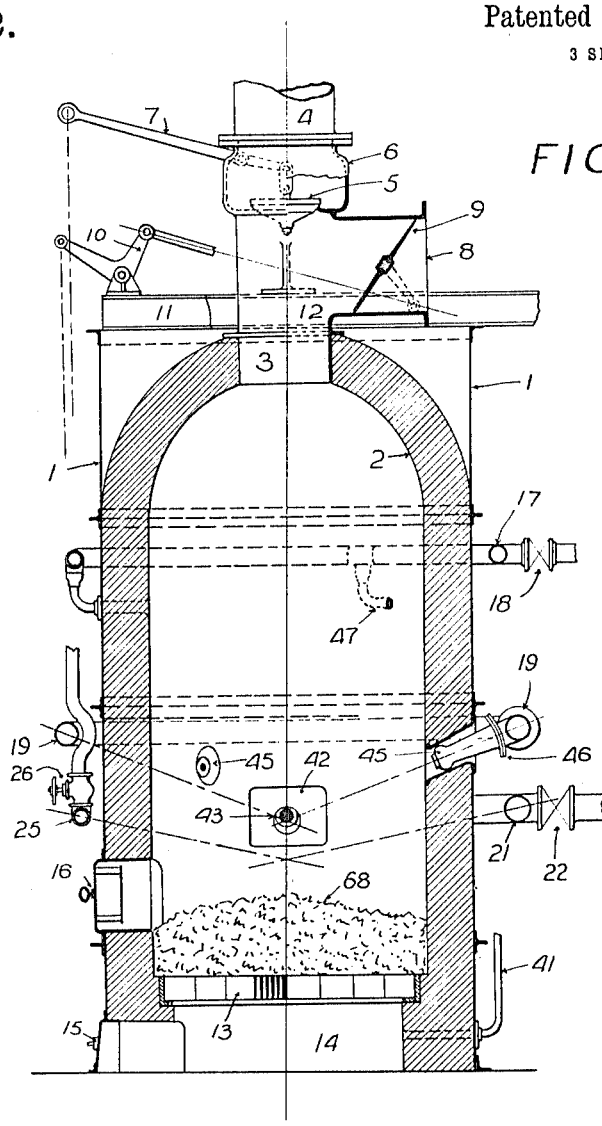
Figure 3:
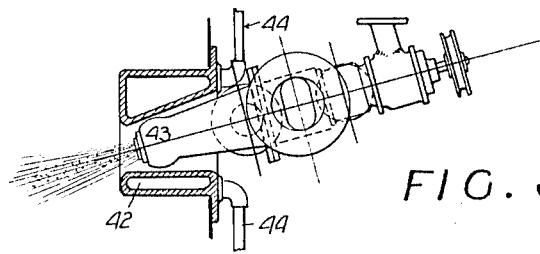
Figure 4:
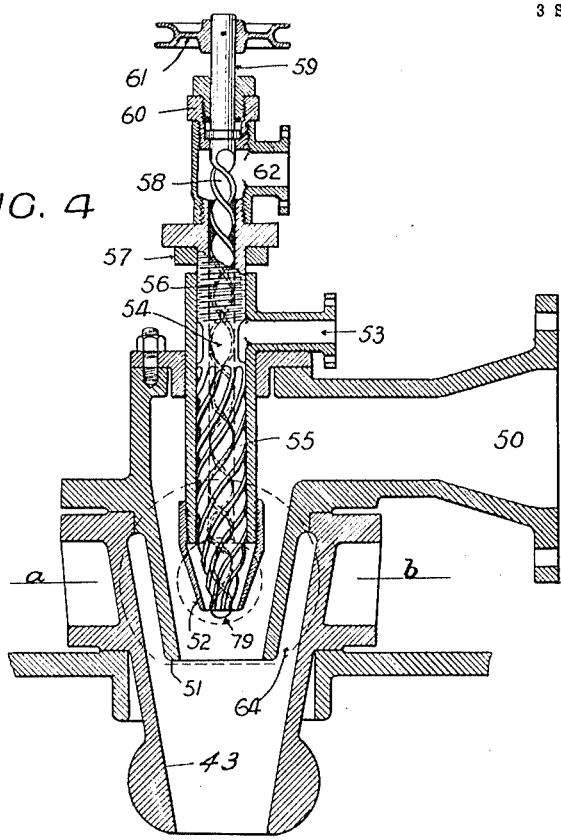

In the accompanying drawings Figure 1 shows a diagrammatic sectional elevation of a plant for the manufacture of sublimed white lead according to my invention, the bag room being in fragment section; Fig. 2 a vertical section through the furnace; Fig. 3 an elevational view of one of the gas-air blow pipes (shown set in a water jacketed orifice in the furnace wall) by which the galena is introduced into the furnace; Fig. 4 longitudinal sectional elevation through one of the gas-air blow pipes; and Fig. 5 a transverse section on line $a$—$b$ Fig. 4.

1 is an iron casing which forms the shell of the shaft furnace, 2 refractory lining of furnace, 3 furnace throat, 4 furnace waste vent, 5 drop valve in vent neck 6 controlled by lever 7, 8 flue head, 9 valve therein, 10 link and lever gear for operating the valve 9, 11 bearers supported on furnace shell and carrying the throat casting 12, 13 furnace bars, 14 ashpit, 15 close fitting ashpit door, 16 close fitting fire door, 17 cold air bustle pipe, 18 valve therein, 19 hot air bustle pipe connected to heater pipes 34 by a pipe 19ˣ, 20 valve therein, 21 cold air bustle pipe serving the blow pipe, 22 valve therein, 23 cold air leg pipe to blow pipe, 24 valve therein, 25 gas bustle pipe to blow pipes, 25′ gas main thereto, 25ˣ valve in main 25′, 26 valves in gas bustle pipe 25, 27 galena feed hoppers, 28 gas producer, 29 positive pressure blower, 30 cold air trunk from blower 29, 31 valved branch from trunk 30 to producer 28, 32 branch cold air main between trunk 30 and bustle pipes 17 and 21, 33 air heating chamber interposed in the run of flues 49 through which furnace fumes are drawn, 34 air heater pipes in chamber 33, 35 vertical pipe depositing and cooling chambers, 36 foot boxes therein, 37 bag room, 38 fabric bags therein, 39 open heads of bags 38, 40 bottoms of bags, which are tied closed with a running string or arc clip fastened, 41 cold air pipe from air service 17 to ashpit 14, 42 water jacketed aperture in furnace wall carrying the nozzle 43 of the blow pipe, 44 water feed and discharge services thereto, 45 hot air twyers angularly adjustable by means of the curved flange 46 and connected to the hot air bustle pipe 19, 47 tangential cold air twyers in upper part of furnace connected to cold air bustle pipe 17.

Figure 5:
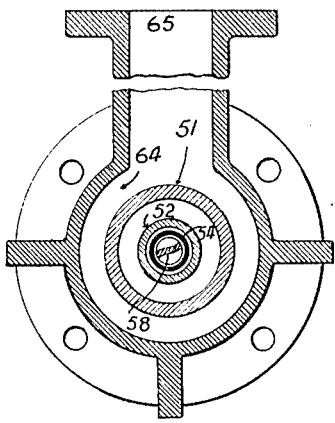

Referring to Figs. 4 and 5 which show the details of the blow pipes,—50 is the gas inlet feed from bustle pipe 19; its nozzle 51 is annularly arranged in relation to the whirling air nozzle 52 to which air is fed through the connection 53 by the pipe 23. 54 is a tubular spindle inserted in the nozzle 52 and formed with rifled grooves 55 on its exterior surface through which grooves air passes from the intake 53 to the nozzle point 52 and is delivered therefrom in a whirling jet. This spindle is neatly adjustable in the nozzle 52 by means of the screwed neck 56 and the backnut 57. An auger 58 with tapered point 79 works in the hollow core of the spindle 54; the shank 59 of this auger passes through a stuffing box 60 and is fitted with a rope wheel 61 or with gearing by which rotary motion is imparted to it. The base of the hopper 27 is set upon the feed neck 62 and delivers thereto powdered ore or concentrates, with or without admixed fuel, which feed is caught up by the auger 58 and moved thereby through the hollow core of the spindle 54 and delivered at the point thereof 79, where it is caught up in a whirling stream of air and in the surrounding annular jet of gas which passes out through the nozzle 51 within an inclosing ring of cool air issuing from the annular passageway 64 which it enters via the neck 65 from the leg pipe 21. This cool air service, like the cool air service through the connection 53 and the gas service through the connection 50, is under pressure, so that the mixed jet of gas and air leaves the point of the nozzle 43 as a blast, carrying in its central portion the dispersed ore or concentrates, with or without fuel admixed therewith. The whirling motion imparted by the air which passes through the rifled grooves 55 tends to whirl the whole jet, and to cause the solid particles suspended therein to be dispersed out of contact with each other, but not sufficiently to be cast out of the blast until they have moved a considerable distance beyond the nose of the twyers 43, during which movement they suffer volatilization.

Referring to Fig. 1, 66 is a belt pulley which is connected up as shown to the positive pressure blower 29, and 67 is a pulley on the same shaft connected up to the auger pulley 61, Fig. 4. 68 Fig. 2, is a bed of live fuel of coke or like fuel in the bottom of the furnace.

The rate of feed of the galena containing material being treated is governed by the speed at which the auger 58 is rotated; that speed is controlled by the rotation of the driving pulley 67 which bears a fixed relation to the driving pulley 66 and therefore to the air pressure delivered by the blower 29, and bears also a fixed relation to the volume of gas delivered from the producer 28 to the furnace. Any reduction in the speed of the pulleys 66 and 67 will result in a corresponding proportionate reduction in the air and gas pressure and in the rate of feed of the mineral and solid fuel. This fixed relationship between the air, gas, mineral, and fuel feed is of much importance as any substantial variation would cause a difference of condition in the temperature or partial pressure of the gases in the furnace, and would therefore involve a difference of greater or less extent in the reactions occurring in the furnace and consequently a variation in the uniformity of the fume.

The approximate required angular positions of the twyer nozzles 43 and 45 are indicated by dotted lines, upon reference to which it will be observed that the feed twyer 43 is directed to a point a few inches above the top of the fuel bed 68 and the hot air twyers 45 are directed to a point a little above the direction point of the feed twyers. Both twyers are, however, made adjustable for vertical angular position in apertures in the furnace walls in order that they may be set to the precise position which experience shall determine in the particular furnace to conduce to the obtaining of the best results. In practice I use two feed twyers directly opposed so that their blasts impinge end to end about the mid line of the furnace, and I use three hot air twyers 45 radially arranged. The feed blasts impinge or collide and are thus broken up near the center of the furnace and the hot air blasts above them similarly impinge and are dispersed, an oxidizing atmosphere in a condition of violent agitation being thus maintained at the point at which the volatilized galena is delivered out of the blow pipe flames. The cold air twyers 47 may be two or more in number and serve the double purpose of introducing cold air into the upper part of the furnace to enrich the furnace atmosphere in oxygen, to reduce its temperature, and to set up a whirling motion, whereby the furnace atmosphere is thoroughly intermixed and the volatilized material suspended therein delayed while in intimate contact with oxygen before it passes out through the throat 3 to the flues.

69 is the terminal flue which enters the compartment 70 at the top of the bag house 37.

71 is a centrifugal exhaust fan for delivering waste gases to atmosphere and exhausting same from the bag chamber 72.

73 is a packing room located below a horizontal diaphragm 74 which forms the bottom of the bag chamber 72, the lower ends of the bag 75 being hung through apertures in said diaphragm 74.

The relative quantities of gas, hot air, cold air, mineral, and solid fuel supplied to the various services are regulated according to the particular conditions of each case. When the mineral is rich in sulfur it will not be necessary to intermix with it any substantial quantity of fuel, and when it is very rich in sulfur the solid fuel may be entirely omitted and the gas feed reduced and the air feed proportionately increased. When the proper adjustment has been secured for the particular class of mineral under treatment, the atmosphere within the furnace under working conditions should, when viewed through a sight hole, appear as a clear white cloud; any tendency to pinkness in the furnace atmosphere indicating a paucity of oxygen. The necessary temperature to insure the uniform effectuation of the reactions is under control by means of the gas and fuel feeds, and the volume of draft in the ashpit introduced thereto by the blast pipe 41. An excess of oxygen in the upper part of the furnace is not productive of any disadvantageous results so long as the temperature is not below the critical point at which reaction is insured. The bed of fuel 68 should be kept as nearly as may be constant, and coördinately with the existence of satisfactory conditions otherwise, a minimum draft only should be introduced through the glass pipe 41.

The method of operation is as follows:—

The mineral under treatment is concentrated to a uniform standard in order that variations of operative conditions shall not be made necessary during the course of treatment of a bulk thereof. The concentrates in finely pulverized condition, and having intermixed with them pulverized coke if their content of sulfur is so low that a deficient temperature in the furnace would be produced otherwise, are delivered into the hoppers 27 and thence pass by gravity to the feed aperture 62 in the blow pipe. From this aperture they are delivered in a constant feed by means of the auger 58 and caught up where ejected at the point of the auger by the enveloping rifled draft of cold air which passes in through the orifice 53, and also enveloped in the annular gas blast which enters through the connection 50, and in the surrounding air blast which enters through the connection 65. The point of the blow pipe being kept relatively cool by the water jacket casing 42, the mineral does not suffer any change before entering the blow pipe flame. If the blow pipe twyers 43 should become heated, there would be risk of the sulfid melting and clogging it, and consequent loss of product and probable fouling of the product by the passing over of sulfid with the fume. The whirling jet of mixed gas and air carrying the powdered suspended mineral in its core becomes inflamed upon contact with the furnace atmosphere which is above its point of ignition, said temperature being raised in the first instance by means of the fire bed 68 and by means of the gas blast (without mineral feed). The galena suffers volatilization in the blow pipe flame and is delivered out of the flame into the furnace atmosphere as a volatilized product. The blast drives this volatilized product toward the place where the blasts impinge, and at and above that point, with the hot atmosphere below and the hot atmosphere rich in oxygen immediately covering it, the volatilized sulfid is sulfated. While the oxidizing volatilized galena is passing up through the furnace there is sufficient time for the perfection of the oxidation reaction in which sulfating is effected before the fume passes into the furnace throat 3; thence the fume passes through the flues 49 into the heating chamber 33 where it gives up some of its heat to the air coil 34; thence it passes to the cooled depositing columns 35 through which it ascends and descends alternately, and then passes into the run of flues 69 and finally therefrom into the upper chamber 70 of the bag house. From this chamber it passes downward into the fabric bags 38 through the open mouths 39 thereof, and solid matters consisting of a white sublimate of uniform quality and color are intercepted by the fabric and collected in the bags, while the gas which forms the vehicle in which said fumes were carried over passes out through said bags and is delivered to atmosphere or for other use by the exhaust fan 71. The pigment collected in the bags 38 is removed therefrom by opening their lower ends 40 and shaking them into hoppers or other receptacles in the packing room 73. Dust and any solid matter other than pure fume which is carried over by the draft is dropped out of the gas fume current in the cooler 33 and in the depositing columns 35, from which it is periodically removed.

In lighting up the furnace, the valve 9 is closed and the valve 5 opened, and when the necessary temperature has been attained the valve 9 is opened and the valve 5 closed and the blow pipe and air twyers put in action. During the working of the furnace, the opening of the valve 9 is regulated so as to control the velocity of the gas and fume passing into the flues.

When ore or concentrates intended to be treated by this process contains arsenic, the greater part of the arsenic is driven off in a preliminary treatment by heat in an oxidizing atmosphere according to known practice, and the arsenical product is condensed and collected in flues and filter chambers. When the ore contains a substantial percentage of antimony, favorable results cannot usually be expected in operating this process.

The unvolatilizable metallic constituents of the ore or concentrates other than gold and silver are more or less completely oxidized and fall with gangue on to and pass through the fuel bed 68, and are recovered by separation from the ashes obtained from the ashpit 14, a small proportion of the lighter products passing over with the fume as an impalpable dust which is separated by gravity from the fume in the cooling and depositing chambers. The volume of dust so carried over is not large, as owing to the low velocity of the fume in passing up through the furnace most of the dust falls onto the fuel bed and passes thence into the ashpit. The ashpit products may be withdrawn by a creeper or through a lock chamber without interrupting the operation of the furnace. Poke holes, not shown, should be provided in the furnace wall to enable the fuel bed 68 to be sliced to clear any accumulation of gangue and metallic products deposited thereon.

By grading the raw material so that the feed consists of a product containing an approximately uniform percentage of galena (or of galena and zinc sulfid) uniformity of product is assured.

Any such excessive temperature in the furnace must be avoided as would result in the fuming over of silver and certain other elements which should be recovered in solid form from the ashpit. The temperature, in order to prevent decomposition of sulfate, must be kept clearly below the dissociation point corresponding with the partial pressure of the gases contained in the upper part of the furnace. The initial temperature must not be so high as to sinter the mineral particles.

What I claim as my invention and desire to secure by Letters Patent is:—

1. A process of manufacturing sublimed white lead, consisting essentially in projecting pulverized lead sulfid mixed with a substantially oxygen-free, combustible hydro-carbon gas through a surrounding layer or stratum of oxygen-containing gas into a heated oxidizing atmosphere, and separating the sublimate from the fume gases.

2. A process of manufacturing sublimed white lead, consisting essentially in spraying pulverized lead sulfid into the reducing core of a blowpipe flame which is directed into an oxidizing atmosphere in a furnace, maintaining a producer fire in the lower part of said furnace, injecting air blasts into the upper part thereof above the blowpipe flame, and separating the sublimate from the fume gases.

3. A process of manufacturing sublimed white lead, consisting essentially in volatilizing pulverized lead sulfid in a dispersed condition within the core of a blowpipe flame, sulfating the volatilized sulfid in a hot oxidizing atmosphere into which said flame is projected, and separating the sublimate from the fume gases.

4. A process of manufacturing sublimed white lead, consisting essentially in volatilizing pulverized lead sulfid within a blowpipe flame into the reducing core of which it is introduced in a cool condition, oxidizing the volatilized sulfid by means of a highly heated oxidizing atmosphere surrounding the blowpipe flame, and separating the sublimate from the fume gases.

5. A process of manufacturing sublimed white lead, consisting in introducing sprays of pulverized lead sulfid into the cores of impinging blowpipe flames directed into a furnace, maintaining a producer fire below said flames, introducing impinging blasts of hot air above the blowpipe flames, maintaining an oxidizing atmosphere and high temperature in the upper part of the furnace, drawing off the fume, and separating the sublimate therefrom.

6. In an apparatus for manufacturing sublimed white lead, the combination, with a blow pipe and a furnace into which said blow pipe discharges, of means for projecting pulverized lead sulfid into the core of said blow pipe, means for maintaining in said furnace a heated oxidizing atmosphere, and means for projecting through said blow pipe around said sulfid a column of oxygen-free hydro-carbon gas, whereby the sulfid is volatilized in a reducing atmosphere and delivered into the said oxidizing atmosphere in a volatilized condition and therin converted into sulfate.

7. A process of manufacturing sublimed white lead, consisting in introducing sprays of pulverized lead sulfid at a measured rate into the cores of opposed blowpipe flames directed into a furnace above the fire therein, introducing opposed blasts of hot air above the blowpipe flames and tangential blasts of cold air into the upper part of the furnace, at a rate proportional to the rate of sulfid speed, drawing off the fume at the furnace throat, and separating the sublimate from the fume gases.

8. In an apparatus for manufacturing sublimed white lead, the combination, with a blow pipe and a furnace into which said blow pipe discharges, of means for projecting pulverized lead sulfid into the core of said blow pipe, means for maintaining in said furnace a heated oxidizing atmosphere, and means for projecting through said blow pipe around said sulfid a column of oxygen-free hydrocarbon gas, whereby the sulfid is volatilized in a reducing atmosphere and delivered into the said oxidizing atmosphere in a volatilized condition and therein converted to sulfate, together with means for maintaining a proportionate relation between the mineral feed and the air supply and the gas supply to the furnace, said means consisting in gearing together the mineral feeder devices and the air and gas forcing devices.

9. A furnace for producing sublimed white lead fume, consisting of a throated chamber lined with refractory material, fitted with firebars to carry a producer fire, and with cold air feed to closed ashpit, opposed gas-air blowpipes having axial auger feeders for delivering pulverized sulfid into the cores of their flames, said blowpipes being directed toward the furnace center and above the fire, opposed twyers directing blasts of hot air toward the furnace center above the blowpipe flames, tangential cold air twyers in the upper part of the furnace; the sulfid feeders and the blast blower being driven from one shaft, whereby a uniform relation is maintained between the sulfid feed and the air and gas supply.

10. A furnace for producing sublimed white lead fume, consisting of a chamber 2 lined with refractory material and connected at the throat 3 with fume flues 49, and having firebars 13, pressure tight fire door 16, and pressure tight ashpit door 15, ashpit cold air feed 41, opposed gas-air blowpipes, radial hot air twyers 45, tangential cold air twyers 47 and auger feeders 58 for delivering powdered sulfid into the cores of the blowpipe jets.

11. The process of manufacturing sublimed white lead which consists essentially in causing pulverized lead sulfid to pass successively through a series of layers of highly heated gases ranging from a highly reducing to a highly oxidizing condition.

In testimony whereof I have signed my name to this specification in the presence of two subscribing witnesses.

ERNEST EDMUND BANES.

Witnesses:
W. I. DAVIS,
M. J. CANDRICK.